(12) United States Patent
Na et al.

(10) Patent No.: US 11,470,034 B2
(45) Date of Patent: Oct. 11, 2022

(54) METHOD AND APPARATUS FOR RECEIVING AND TRANSMITTING PERIODIC NOTIFICATION IN MACHINE TO MACHINE SYSTEM

(71) Applicants: Hyundai Motor Company, Seoul (KR); Kia Motors Corporation, Seoul (KR)

(72) Inventors: Young Jin Na, Gyeonggi-do (KR); Min Byeong Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/064,208

(22) Filed: Oct. 6, 2020

(65) Prior Publication Data
US 2021/0105240 A1    Apr. 8, 2021

Related U.S. Application Data

(60) Provisional application No. 62/911,691, filed on Oct. 7, 2019.

(51) Int. Cl.
| | |
|---|---|
| H04L 12/24 | (2006.01) |
| H04L 41/0803 | (2022.01) |
| H04L 51/224 | (2022.01) |
| H04L 67/12 | (2022.01) |
| H04W 4/70 | (2018.01) |
| H04L 67/60 | (2022.01) |

(52) U.S. Cl.
CPC ............ *H04L 51/224* (2022.05); *H04L 67/12* (2013.01); *H04L 67/60* (2022.05); *H04W 4/70* (2018.02)

(58) Field of Classification Search
CPC ......... H04L 51/24; H04L 67/12; H04L 67/32; H04L 67/26; H04L 67/325; H04L 67/04; H04W 4/70; H04W 4/12; H04W 68/12
See application file for complete search history.

(56) References Cited

U.S. PATENT DOCUMENTS

| | | | |
|---|---|---|---|
| 2016/0088420 A1* | 3/2016 | Kim ...................... | H04L 67/025 370/328 |
| 2016/0192111 A1* | 6/2016 | Choi ..................... | H04L 67/26 455/507 |
| 2016/0234691 A1* | 8/2016 | Jeong ................... | H04W 4/70 |
| 2019/0230175 A1* | 7/2019 | Wang, IV ............. | H04L 67/26 |
| 2020/0288291 A1* | 9/2020 | Wang ................... | H04L 67/12 |

* cited by examiner

*Primary Examiner* — Yves Dalencourt
*Assistant Examiner* — Elizabeth Kassa
(74) *Attorney, Agent, or Firm* — Fox Rothschild LLP

(57) ABSTRACT

A method and apparatus are configured to receive and transmit a periodic notification in a machine-to-machine (M2M) system. The method includes steps of: receiving a subscription request message requesting a periodic notification for a specific resource from an M2M entity; and periodically transmitting a notification message to the M2M entity according to the subscription request message, wherein the notification message is periodically transmitted irrespective of whether the specific resource changes.

17 Claims, 9 Drawing Sheets

METHOD AND APPARATUS FOR RECEIVING AND TRANSMITTING PERIODIC NOTIFICATION IN MACHINE TO MACHINE SYSTEM

CROSS REFERENCE TO RELATED APPLICATION

The present application claims the benefit of U.S. Provisional Application No. 62/911,691, filed Oct. 7, 2019, the entire contents of which are incorporated by reference herein.

BACKGROUND

(a) Technical Field

The present disclosure relates to a method and apparatus for receiving and transmitting a periodic notification in a machine-to-machine (M2M) system. In the present disclosure, periodic notification may be executed regardless of whether a subscribed-to resource is changed in an M2M system.

(b) Description of the Related Art

Recently, a Machine-to-Machine (M2M) system has been introduced. An M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering. Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security, and health.

SUMMARY

The present disclosure provides a method and device for transmitting and receiving a periodic notification in a machine-to-machine (M2M) system.

According to the present disclosure, a periodic notification transmitting method in an M2M system includes receiving a subscription request message requesting a periodic notification for a specific resource from an M2M entity and periodically transmitting a notification message to the M2M entity according to the subscription request message, wherein the notification message is periodically transmitted irrespective of whether or not the specific resource changes.

According to the present disclosure, a periodic notification receiving method in an M2M system includes creating a subscription request message requesting a periodic notification for a specific resource and transmitting the subscription request message to an M2M entity and periodically receiving a notification message from the M2M entity, wherein the notification message is periodically received irrespective of whether or not the specific resource changes.

According to the present disclosure, an M2M apparatus in an M2M system includes a communication unit for transmitting and receiving a signal and a processor for controlling the communication unit, wherein the processor receives a subscription request message requesting a periodic notification for a specific resource from an M2M entity and periodically transmits a notification message to the M2M entity, and wherein the notification message is periodically transmitted irrespective of whether or not the specific resource changes.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION OF THE DISCLOSURE

Figure 1:
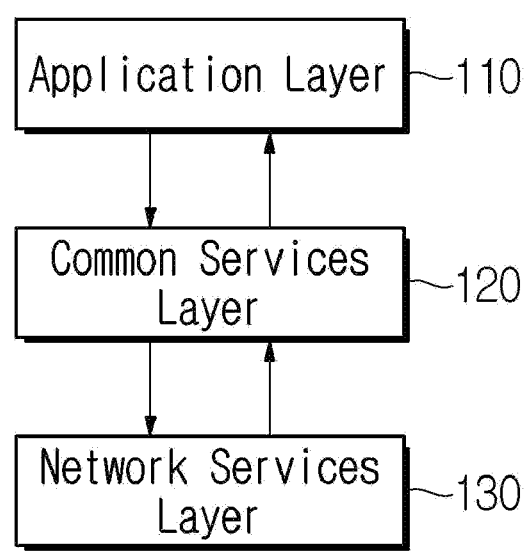
FIG. 1 is a view illustrating a layered structure of a Machine-to-Machine (M2M) system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various exemplary embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a task in M2M communication network may be performed in a process of network control and data transmission in a system managing the communication network.

In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. The M2M server refers to a server for M2M communication and may be a fixed station or a mobile station.

In the present specification, an entity may refer to hardware such as the M2M device, M2M gateway and M2M server. For example, an entity may be used to refer to software configuration in a layered structure of M2M system and is not limited to the embodiment described above. In addition, for example, the present disclosure mainly describes an M2M system but is not solely applied thereto.

The M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

Further, in the present disclosure, storage may include a database. Sensitive data may be used to refer to private data and personal data. Additionally, in the present disclosure, M2M terminal may be used interchangeably with M2M apparatus and M2M device. A communication unit may be used interchangeably with a communication unit.

Additionally, oneM2M is a de facto standards organization that was founded to develop a communal IoT service platform sharing and integrating application service infrastructure (platform) environments beyond fragmented service platform development structures limited to separate industries like energy, transportation, national defense and public service. Further, oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected vehicles, home automation, security and health. In this regard, oneM2M has developed a set of standards defining a single horizontal platform for data exchange and sharing among all the applications.

Applications across different industrial sections may also be considered by oneM2M. Similar to an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE). The common services layer 120 may be configured to provide a set of services that are grouped into CSFs according to functions. A multiplicity of instantiated CSFs constitutes CSEs. CSEs may interface with applications (e.g., application entities or AEs in the terminology of oneM2M), other CSEs and base networks (for example, network service entities or NSEs in the terminology of oneM2M).

The network services layer 130 may be configured to provide the common services layer 120 with services such as device management, location service, and device triggering. Herein, an entity operating based on the network layer 120 may be a network service entity (NSE).

Figure 2:
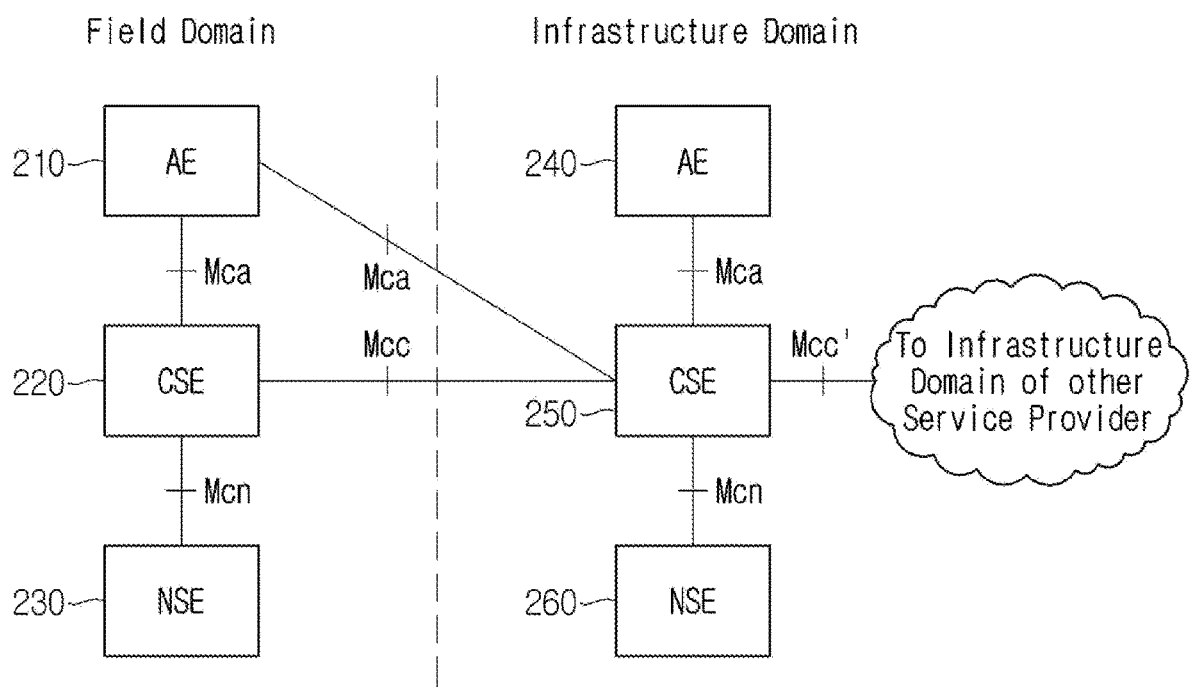
FIG. 2 is a view illustrating reference points in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may be configured to perform communication via a reference point (e.g., Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
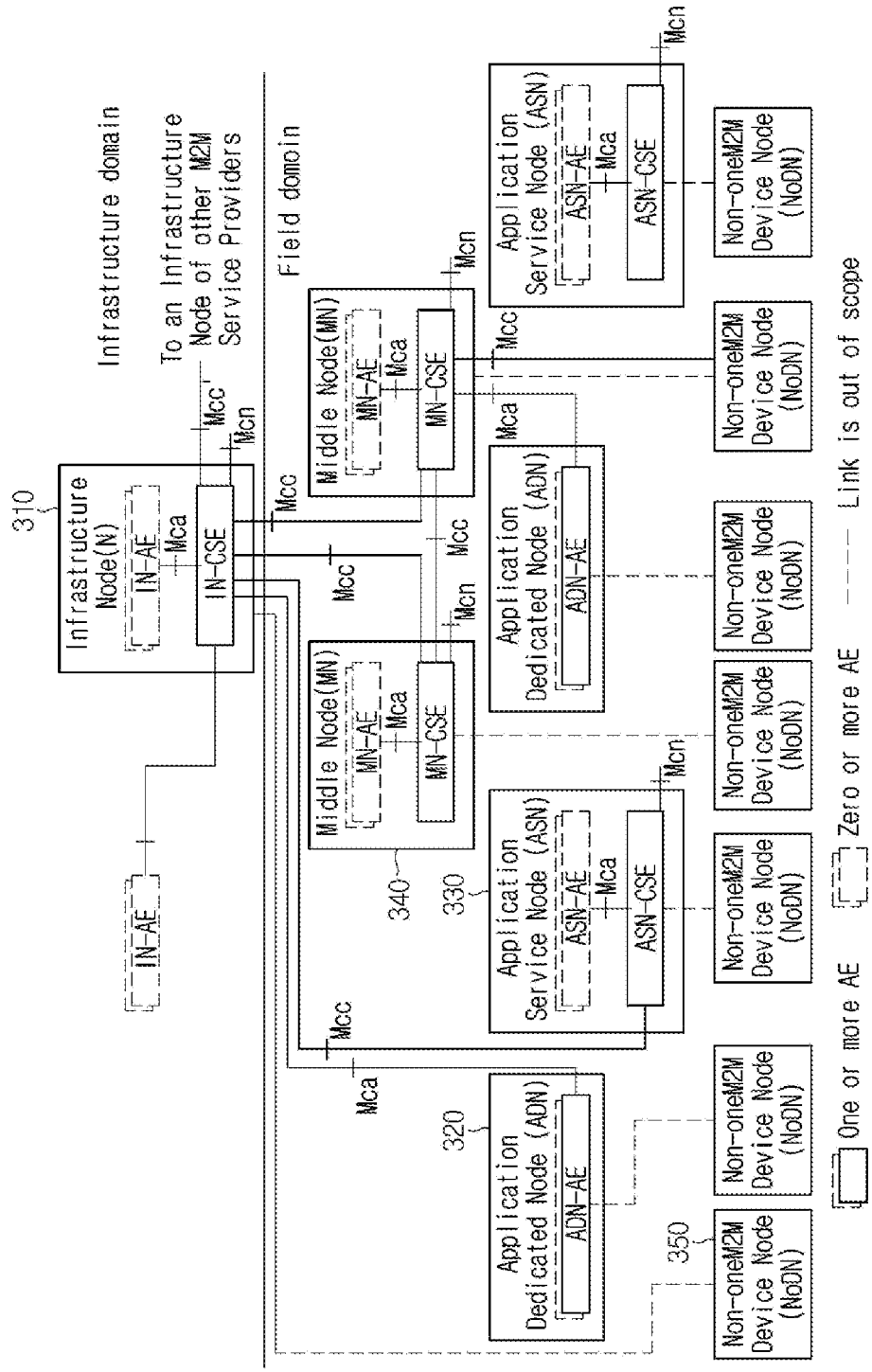
FIG. 3 is a view illustrating a common service function in an M2M system according to the present disclosure.

FIG. 3 is a view illustrating each node in an M2M system according to the present disclosure. Referring to FIG. 3, an infrastructure domain of a specific M2M service provider may be configured to provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Particularly, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. Particularly, the MN may be set in the field domain. An MN may be connected to another MN or IN based on a reference point. In addition, for example, an MN may be set in an M2M gateway in hardware. In addition, as an example, a non-M2M terminal node 350 (Non-M2M device node, NoDN) is a node that does not include M2M entities. It may be a node that performs management or collaboration together with an M2M system.

Figure 4:
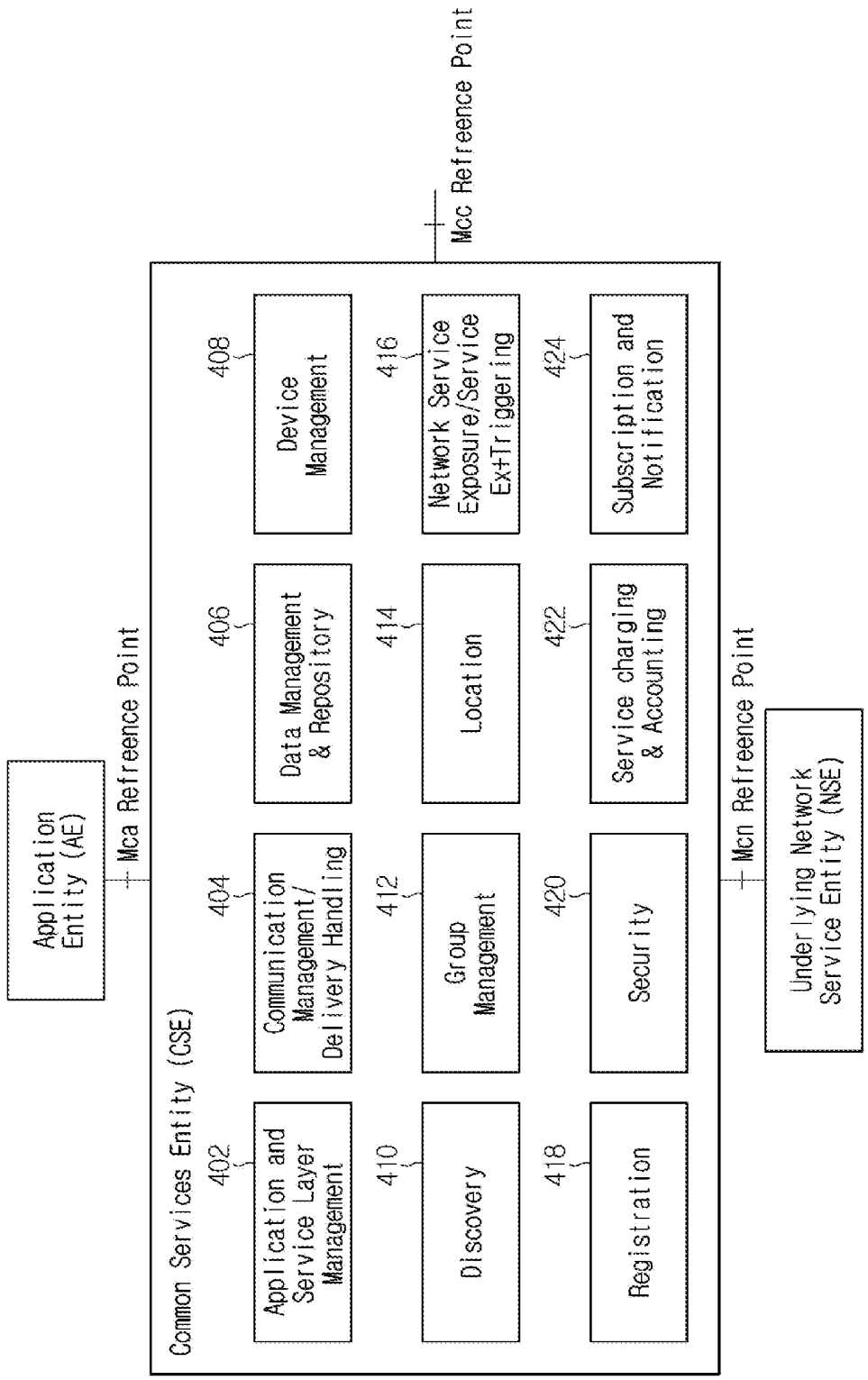
FIG. 4 is a view illustrating a common service function in an M2M system according to the present disclosure.

FIG. 4 is a view illustrating a common service function in an M2M system according to the present disclosure. Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may be configured to operate based on a common service function. In addition, a common service function may be possible in other exemplary embodiments and is not limited to the above-described exemplary embodiment.

The application and service layer management 402 CSF may be configured to provide management of AEs and CSEs. The application and service layer management 402 CSF may include the configuring, problem solving and upgrading of CSE functions and the capability of upgrading AEs. The communication management and delivery handling 404 CSF may be configured to provide communications with other CSEs, AEs and NSEs. The communication management and delivery handling 404 CSF may be configured to determine at what time and through what connection communications are to be delivered, and determine to buffer communication requests to thus deliver the communications delivered later, if necessary and permitted.

The data management and repository 406 CSF may be configured to provide data storage and transmission functions (e.g., data collection for aggregation, data reformatting, and data storage for analysis and sematic processing). The device management 408 CSF may be configured to provide the management of device capabilities in M2M gateways and M2M devices. The discovery 410 CSF may be configured to provide an information retrieval function for applications and services based on filter criteria.

The group management 412 CSF may be configured to provide processing of group-related requests. The group management 412 CSF enables an M2M system to support bulk operations for many devices and applications. The location 414 CSF may be configured to enable AEs to obtain geographical location information. The network service exposure/service execution and triggering 416 CSF may be configured to manage communications with base networks for access to network service functions.

The registration 418 CSF may be configured to register AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to provide a function of allowing subscription to an event and notifying the occurrence of the event.

Figure 5:
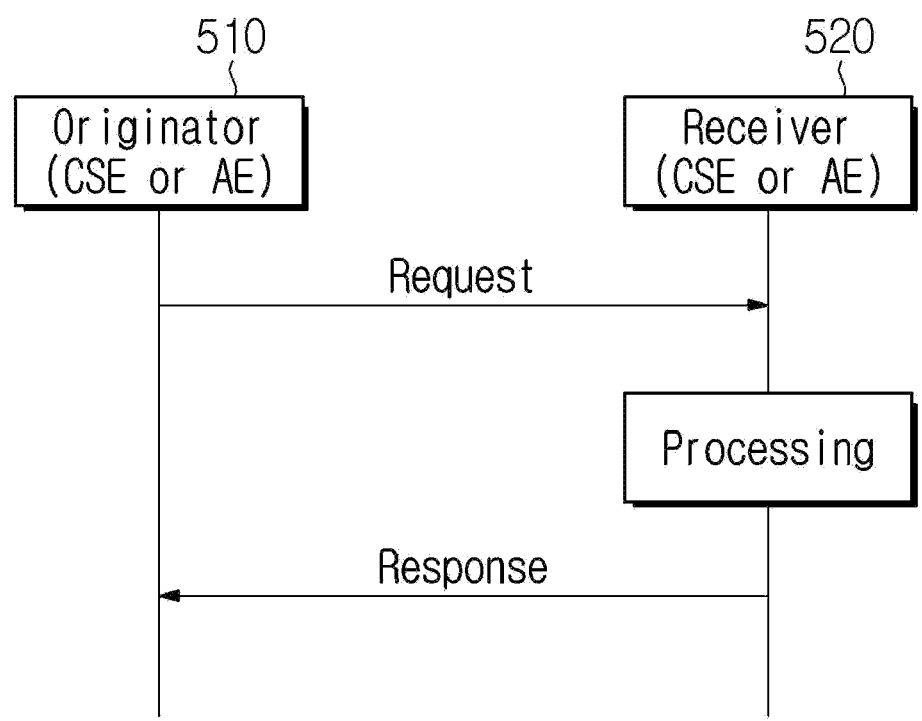
FIG. 5 is a view illustrating that an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described exemplary embodiment.

Additionally, a request message transmitted by the originator 510 may include at least one parameter. Herein, for example, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510.

A receiving terminal-related parameter may be a parameter for the receiver 520. An identification parameter may be a parameter required for identification of each other.

An operation parameter may be a parameter for distinguishing operations. For example, an operation parameter may be set to any one among Create, Retrieve, Update, Delete and Notify. In other words, the parameter may aim to distinguish operations. Particularly, in response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, if a parameter is valid and authorized, the receiver 520 may be configured to check whether there is a requested resource and may perform processing accordingly.

For example, when an event occurs, the originator 510 may be configured transmit a request message including a parameter for notification to the receiver 520. The receiver 520 may be configured to check a parameter for a notification included in a request message and perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred
To - the identifier of the Originator or the Transit CSE
that sent the corresponding non-blocking request
From - the identifier of the Receiver
Originating Timestamp - when the message was built
Result Expiration Timestamp - when the message expires
Event Category - what event category shall be used for
the response message
Content Status
Content Offset
Token Request Information
Assigned Token Identifiers
Authorization Signature Request Information
Release Version Indicator - the oneM2M release version
that this response message conforms to A filter criteria condition, which can be used in a request message or a response message, may be defined as in Table 2 and Table 3 below.

TABLE 2

| Condition tag | Multi-plicity | Description Matching Conditions |
|---|---|---|
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |

TABLE 2-continued

| Condition tag | Multiplicity | Description Matching Conditions |
|---|---|---|
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-valuel, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g., creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description Filter Handling Conditions |
|---|---|---|
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned.<br>If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |

TABLE 3-continued

| Condition tag | Multi-plicity | Description |
|---|---|---|
| | | Filter Handling Conditions |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g., . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify
To - the address of the target resource on the target CSE
From - the identifier of the message Originator
Request Identifier - uniquely identifies a Request message |
| Operation dependent Optional | Content - to be transferred
Resource Type - of resource to be created
Originating Timestamp - when the message was built
Request Expiration Timestamp - when the request message expires
Result Expiration Timestamp - when the result message expires
Operational Execution Time - the time when the specified operation is to be executed by the target CSE
Response Type - type of response that shall be sent to the Originator
Result Persistence - the duration for which the reference containing the responses is to persist
Result Content - the expected components of the result |

TABLE 4-continued

| Request message parameter |
|---|
| Event Category - indicates how and when the system should deliver the message
Delivery Aggregation - aggregation of requests to the same target CSE is to be used
Group Request Identifier - Identifier added to the group request that is to be fanned out to each member of the group
Group Request Target Members-indicates subset of members of a group
Filter Criteria - conditions for filtered retrieve operation
Desired Identifier Result Type - format of resource identifiers returned
Token Request Indicator - indicating that the Originator may attempt Token Request procedure (for Dynamic Authorization) if initiated by the Receiver
Tokens - for use in dynamic authorization
Token IDs - for use in dynamic authorization
Role IDs - for use in role based access control
Local Token IDs - for use in dynamic authorization
Authorization Signature Indicator - for use in Authorization Relationship Mapping
Authorization Signature - for use in Authorization Relationship Mapping
Authorization Relationship Indicator - for use in Authorization Relationship Mapping
Semantic Query Indicator - for use in semantic queries
Release Version Indicator - the oneM2M release version that this request message conforms to.
Vendor Information |

A normal resource includes a complete set of representations of data forming the base of information to be managed. Unless qualified as either "virtual" or "announced", the resource types in the present document are normal resources. A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to generate a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources may be specified in associated to CSE. Resources are representation of component and element in CSE at oneM2M system. Other CSEs, AEs, application data for sensor and commands are notified to CSE as an indication of resource representation. A resource is an entity that is uniquely addressable in oneM2M architecture. Resource is delivered and may be manipulated by CRUD (Create Retrieve Update Delete) operation.

A child resource is a sub-resource of the parent resource. The parent resource may include the reference to at least one child resource. An attribute may contain the information of resource. The set of attributes is not listed within the graphical representation of the resource, unless common to all resources. An attribute may be distinguished as universal attribute, common attribute and resource-specific attribute. The universal attribute is an attribute that appears on all resources. The common attribute is an attribute that appears on multiple resources and has the same meaning wherever it appears.

Table 5 may show the examples of the attributes that are virtual or not announced, general and universal on all resources.

TABLE 5

| Attribute Name | Description |
| --- | --- |
| resourceType | Resource Type. This Read Only (assigned at creation time. and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource. This attribute is mandatory for all resources and the value is assigned by the system at the time when the resource is locally created. Such an attribute cannot be changed. |
| lastModifiedTime | Last modification time/date of the resource. The lastModifiedTime value is set by the Hosting CSE when the resource is created, and the lastModifiedTime value is updated when the resource is updated. |

Table 6 shows examples of attributes that are commonly used in a plurality of resource types (but, not all resource types) that are virtual or not announced.

TABLE 6

| Attribute Name | Description |
| --- | --- |
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g., Retrieve, Update, Delete, etc.). For an Update or Delete operation to a resource, the update or delete of the accessControlPolicyIDs attribute, if applicable, shall be performed prior to the update or delete of any other attributes of the resource. To update this attribute, a Hosting CSE shall check whether an Originator has Update privilege in any selfPrivileges, regardless of privileges, of the <accessControlPolicy> resources which this attribute originally references. After successful update of the accessControlPolicyIDs attribute, resource access checking for other attributes to be updated shall use the new privileges defined in the <accessControlPolicy> resource(s) that are referenced by the newly updated accessControlPolicyIDs attribute. Similarly, to delete this attribute, a Hosting CSE shall check whether an Originator has Updateprivilege in any selfPrivileges, regardless of privileges, of the <accessControlPolicy> resources which this attribute originally references. After successful deletion of the accessControlPolicyIDs attribute, resource access checking for other attributes to be deleted shall use the default access privileges as described in the following paragraphs. If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases. |

TABLE 6-continued

| Attribute Name | Description |
|---|---|
| | If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute. All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g., by updating the attribute with NULL when doing a full UPDATE, in which case the Hosting CSE can decide on a new value. If the Originator does not provide a value in the CREATE operation the system shall assign an appropriate value depending on its local policies and/or M2M service subscription agreements. A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/ CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement. If announceTo attribute includes resource address(es), the present document does not provide any means for validating these address(s) for announcement purposes. It is the responsibility of the Hosting-CSE referenced by the resource address(s) to validate the access privileges of the originator of the Request that triggers the announcement. |

TABLE 6-continued

| Attribute Name | Description |
| --- | --- |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources. This attribute is optional.<br>The value of the labels attribute is a list of individual labels, each of them being:<br>Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. The details of this attributes are described in oneM2M TS-0003 [2].This attribute is optional and if not present it means that the represented entity does not support oneM2M end-to-end security procedures. |
| DynamicAuthorizationConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests.<br>Consultation-based dynamic authorization is only performed for a targeted resource if and only if it is linked to an enabled <dynamicAuthorizationConsultation> resource. If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

Meanwhile, FIG. 5 may also be applied to a procedure related to a subscription resource in an M2M system.

In an M2M system (for example, oneM2M), an entity interested in a change of a resource may subscribe to a notification of the change according to a resource change. In this case, the change of the resource to be notified may comply with notification event criteria, and a resource for subscription should be set in order to subscribe to a notification, that is, in order to receive the notification. A resource for subscription may be referred to as a subscription resource or a <subscription> resource. When a subscription resource is created/set and a change/modification satisfying a condition set to the subscription resource occurs in a subscribed-to resource or subscribed resource, a device (or entity), for which the subscription resource is set, may transmit a notification to an address (e.g., notificationURL or contact attribute) set to the subscription resource. Address information set in a subscription resource (e.g., notification-URl or contact attribute) may be used as identification information of a notification target. A device (or entity) to which a subscription resource is set and/or which includes a subscribed-to resource may be referred to as a hosting device (or hosting entity). For example, a subscribed-to resource may exist in a CSE of an M2M gateway. In this case, the M2M gateway may be referred to as a hosting device, and the CSE of the M2M gateway may be referred to as a hosting CSE.

A subscription procedure may be performed using a subscription resource in a resource-oriented manner. For example, a subscription resource may be created to subscribe to a specific subscribed-to resource, a condition for subscription may be changed by modifying a subscription resource, and a subscription resource may be deleted when subscription is not needed anymore.

A subscription resource may include information on a subscribed-to resource and information on a subscription information scope for the subscribed-to resource and a subject receiving a notification about the subscribed-to resource. A relation between a subscribed-to resource and a subscription resource may be represented as a parent-child (or hierarchical) relation. For example, a <container> resource including a subscribed-to resource may have a <subscription> resource as a child resource. When a parent subscribed-to resource is deleted, the <subscription> resource may be deleted.

When a subscription resource is a child resource, a notification for indicating a status change of a parent resource may be delivered to an entity specified in address information (e.g., a notificationURl or contact attribute) in the subscription resource according to configuration (or attribute configuration) of the subscription resource. When an originator has a RETRIEVE (or READ) permission for a subscribable resource, the originator may create a subscription resource. A resource subscriber may be an originator of a subscription request or be another entity. When there is a modification to a subscribed-to resource, the modification may be compared with a specific attribute (e.g., notificationCriteria attribute) and thus it may be determined whether to transmit a notification to the resource subscriber.

A subscription resource (e.g., <subscription> resource) may perform blocking update (blocking "UPDATE") for a resource or an attribute of resource. In this case, a notification may be transmitted as a result of the "UPDATE" request to a notification target. Each subscription resource (e.g., <subscription> resource) may include a notification policy specifying what notification, when and how will be performed. A notification policy may be applied simultaneously with a communication management and delivery handling (CMDH) policy.

When a subscription resource (e.g., <subscription> resource) is deleted and a <subscriberURI> attribute is provided by a subscriber, a notification may be transmitted to the subscriber indicated by the <subscirberURI> attribute.

A subscription resource (e.g., <subscription> resource) may have various attributes and child resources. For example, a subscription resource (e.g., <subscription> resource) may have the following child resources.

TABLE 7

| Child Resources of <subscription> | Child Resource Type | Description |
|---|---|---|
| notificationSchedule | <schedule> | In the context of the <subscription> resource, the notificationSchedule specifies when notifications may be sent by the Hosting CSE to the notificationURI(s). See clause 9.6.9. |

Meanwhile, as shown in the above table, a subscription resource (e.g., <subscription> resource) may have a scheduling resource (e.g., <schedule> resource) containing scheduling information as a child resource. The function, role and usage of a scheduling resource may be different according to an associated resource type. For example, when a scheduling resource corresponds to a child resource of a <node> resource, the scheduling resource may indicate a time period where communication through an underlying network is enabled. Herein, when various underlying networks are provided, a maximum of one scheduling resource may exist in each underlying network. A single scheduling resource may be used for a multiplicity of underlying networks. In addition, the <mgmtLink> attribute of <cmdhNwAccessRule>, which is a child resource of a <node> resource, may be linked with another child resource <schedule> of the <node> resource. When a scheduling resource is a child resource of a resource <CAEBase>, a time may be indicated where CSE is expected to perform processing. Meanwhile, when a notification is capable of being transmitted to a notification target, a scheduling resource, which is a child resource of a subscription resource, may indicate a time period. For example, a scheduling resource (e.g., <schedule>) may have the following attributes of Table 8.

TABLE 8

| Attributes of <schedule> | Multiplicity | RW/RO/WO | Description |
|---|---|---|---|
| scheduleElement | 1 (L) | RW | Each item of the scheduleElement list shall be composed from seven fields of second, minute, hour, day of month, month, day of week and year. |
| networkCoordinated | 0 . . . 1 | RW | Indicates if IN-CSE shall perform schedule coordination with an Underlying Network. This attribute is only applicable when <schedule> is a child resource of <node>. The supported values are: True: The IN-CSE shall perform schedule coordination. False: The IN-CSE may not perform schedule coordination. NOTE: The schedule coordination is also subject to IN-CSE local policy. |

Meanwhile, a subscription resource (e.g., <subscription> resource may include the following attributes of Table 9.

TABLE 9

| Attribute Name | Description |
|---|---|
| resourceType | Resource Type. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| parentID | The system shall assign the value to this attribute according to the parameters given in the CREATE Request. |
| expirationTime | Time/date after which the resource will be deleted by the hosting CSE. This attribute can be provided by the issuer, and in such a case it will be regarded as a hint to the hosting CSE on the lifetime of the resource. |
| creationTime | Time/date of creation of the resource. |
| lastModifiedTime | Last modification time/date of the resource. |

TABLE 9-continued

| Attribute Name | Description |
| --- | --- |
| accessControlPolicyIDs | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g., Retrieve, Update, Delete, etc). |
| notificationCriteria | When notification events happen on the subscribed-to resource, the list of notification events that match the notification criteria shall be sent as a Notify request. |
| expirationCounter | When the number of notifications becomes the same as this counter, the <subscription> resource shall be deleted. This attribute (notification policy) indicates that the subscriber wants to set the life of this subscription to a limit of a maximum number of notifications. When the number of notifications sent reaches the count of this counter, the <subscription> resource shall be deleted, regardless of any other policy. |
| notificationURI | List of URI(s) where the resource subscriber will receive notifications. This list of URI(s) may not represent the resource subscriber entity. |
| aggregationURI | URI to aggregate notifications from group members of a <group> resource. |
| batchNotify | Indicates that notifications should be batched for delivery. When set, notification events are temporarily stored until either a specified number is ready to send or until a duration after the first notification event has expired. |
| rateLimit | Indicates that notifications should be rate-limited. When set, notification events that exceed a specified number within a specified time are temporarily stored then sent when the number of events sent per specified time falls below the limit. |
| priorSubscriptionNotify | Indicates that when this subscription is created, whether notification events prior to subscription should be sent, e.g., send prior "n" notifications, if available. |
| notificationStoragePriority | Indicates a priority for this subscription relative to other subscriptions belonging to this same subscriber for retention of notification events when storage is congested. |
| notificationStructure | Type of information that shall be contained in notifications. E.g., modified attribute only of a subscribed-to resource, a whole subscribed-to resource, and/or URI of a corresponding <subscription> resource. |
| subscriberURI | URI that the <subscription> created entity can get notification from the <subscription> hosting CSE. <subscription> deletion shall be notified if this URI is provided. |
| eventNotificationCriteria | This attribute (notification policy) indicates the event criteria for which a notification is to be generated. When no eventNotificationCriteria attribute is present in a <subscription> resource, the Hosting CSE shall trigger notifications for this subscription when any of the attributes of the subscribed-to resource is modified. |

Table 9 is merely an example. An attribute of a subscription resource may be configured differently from Table 9.

Herein, among the attributes of Table 9 above, <eventNotificationCriteria> may have the following condition tag of Table 10.

TABLE 10

| Condition tag | Matching Condition |
| --- | --- |
| createdBefore | The creationTime attribute of the resource is chronologically before the specified value. |
| createdAfter | The creationTime attribute of the resource is chronologically after the specified value. |
| modifiedSince | The lastModifiedTime attribute of the resource is chronologically after the specified value. |
| unmodifiedSince | The lastModifiedTime attribute of the resource is chronologically before the specified value. |
| stateTagSmaller | The stateTag attribute of the resource is smaller than the specified value. |
| stateTagBigger | The stateTag attribute of the resource is bigger than the specified value. |
| expireBefore | The expirationTime attribute of the resource is chronologically before the specified value. |
| expireAfter | The expirationTime attribute of the resource is chronologically after the specified value. |
| sizeAbove | The contentSize attribute of the <contentInstance> resource is equal to or greater than the specified value. |
| sizeBelow | The contentSize attribute of the <contentInstance> resource is smaller than the specified value. |
| notificationEventType | The type of event that shall trigger a notification. If multiple notificationEventType tags are present, a notification shall be triggered if any of the configured events occur. Note that not all permutations of event type are meaningful. Possible notification event type values are: Update to attributes of the subscribed-to resource Deletion of the subscribed-to resource, |

TABLE 10-continued

| Condition tag | Matching Condition |
|---|---|
| | Creation of a direct child of the subscribed-to resource, Deletion of a direct child of the subscribed-to resource An attempt to retrieve a <contentInstance> Direct-child-resource of a subscribed-to <container> resource is performed while this <contentInstance> child resource is an obsolete resource or the reference used for retrieving this resource is not assigned. This retrieval is performed by a RETRIEVE request targeting the subscribed-to resource with the Result Content parameter set to either "child-resources" or "attributes + child-resources". This value for the eventNotificationType tag implies that the subscribed-to resource shall be an <container> resource. Otherwise this setting is not valid. Trigger Received targeting the MN/ASN-AE associated with the <AE> parent resource. This implies that the subscribed-to resource shall be an <AE> resource instance. Otherwise this setting is not valid. G. Update to attributes of the subscribed-to resource with blocking of the triggering UPDATE operation. For this eventNotificationType value setting, only one single Notification Target shall be present in the notificationURI attribute - see notificationURI attribute definition. This value for the eventNotificationType tag shall not be combined with any other eventNotificationType tag value. This value for notificationEventType establishes a subscription that is triggered for the same events as for the value "Update to attributes of the subscribed-to resource". However, upon occurrence of a triggering UPDATE operation that has been validated and results in an authorized UPDATE operation, the triggering UPDATE operation shall be blocked by the Hosting CSE until a notification request was sent out and a corresponding response message was received or a timeout happens. When the response status code of the notification response message indicates a successful notification reception in combination with a successful notification action taken by the Notification Target entity, the triggering UPDATE operation shall be completed with a successful update of the targeted attribute(s). If the notification response message indicates an unsuccessful notification reception or a successful notification reception with unsuccessful notification action by the targeted entity or times out, the blocked UPDATE operation shall be completed with no success and no change of the targeted attribute(s). For any subscribed-to resource there shall exist a maximum of one subscription with this setting of notificationEventType. All other notification policies shall not be allowed when this setting of notificationEventType is used. The notificationContentType shall be "modified attibutes". When an UPDATE operation has been blocked due to triggering this type of notification, any other occurring UPDATE or DELETE requests to the same resource shall be handled only after the blocked UPDATE operation has been completed. |

Table 10 is merely an example. The condition tag of <eventNotificationCriteria> may be configured differently from Table 10.

Figure 6:
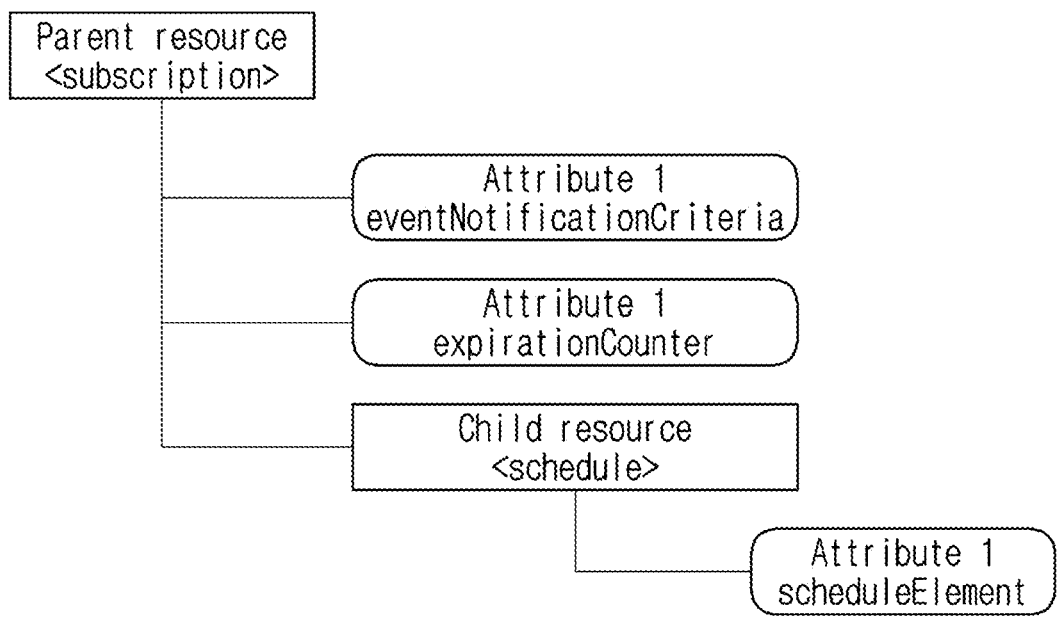
FIG. 6 is a view showing an attribute of a subscription resource and a child resource in an M2M system according to one embodiment of the present disclosure.

FIG. 6 is a view showing an attribute of a subscription resource and a child resource according to one embodiment of the present disclosure. More particularly, FIG. 6 is a view showing the above-described subscription resource, child resource and associated attribute as an embodiment.

In one embodiment, a subscription resource (e.g., <subscription>) may be a parent resource and include <eventNotificationCriteria> attribute, which indicates an event type where a notification is capable of being performed, and <expirationCounter> attribute. A subscription resource may include a scheduling resource (e.g., <schedule>) as a child resource, and a scheduling resource (e.g., <schedule>) may include <scheduleElement> as attribute.

When an event occurs, which meets at least one of specific event criteria as mentioned above, notification may be performed. Even when the event occurs periodically despite any change, notification may be performed. Nevertheless, a current subscription resource (e.g. <subscription>) and a scheduling resource (e.g., <schedule>) are not capable of supporting a periodic notification that is irrelevant to whether or not there is a change of resource meeting a notification criterion.

In one embodiment, <eventNotificationCriteria> capable of being one of attributes of a subscription resource (e.g., <subscription>) may indicate that a change of a subscribed-to resource occurs. In this case, only when the change meets an event criterion for generating a notification, a notification may occur to a notification target and thus a periodic notification is difficult to expect. In addition, a scheduling resource (e.g., <schedule>), which is a current child resource, is capable of indicating only a time period, where notification to a notification target is possible, but does not support periodic notification.

Accordingly, the present disclosure is directed to propose a technique of transmitting and receiving a periodic notification in an M2M system.

Hereinafter, the technique will be described in detail with reference to accompanying drawings.

Figure 7:
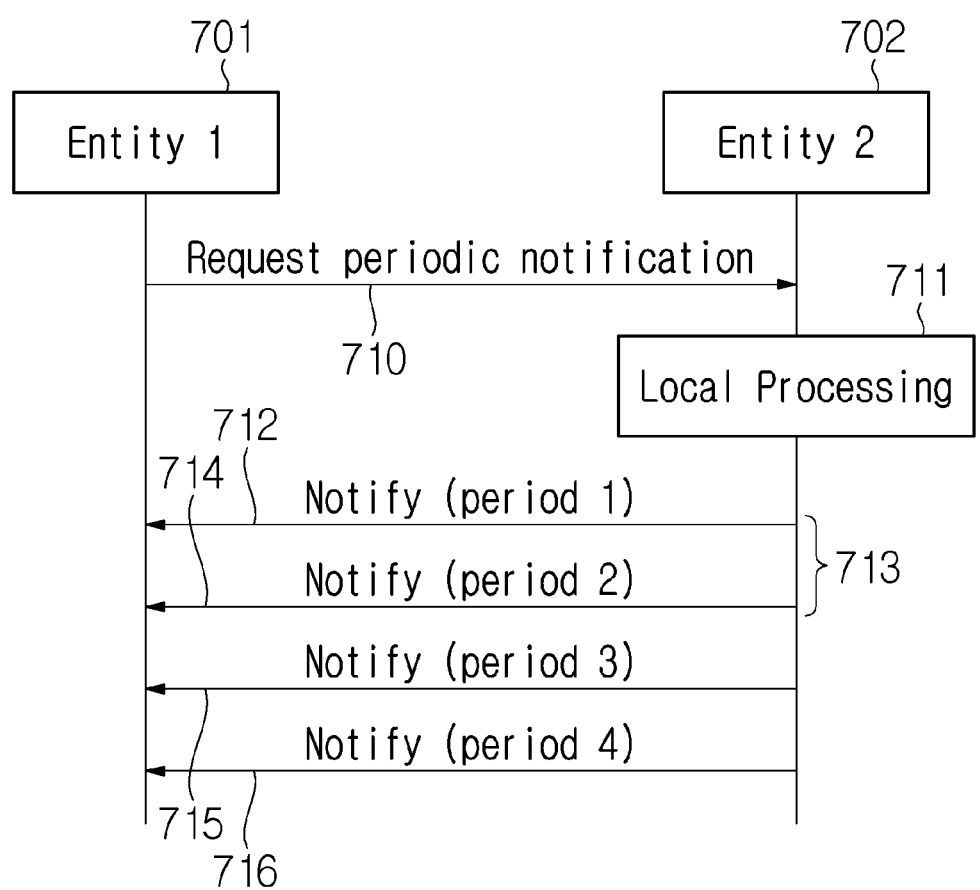
FIG. 7 is a view showing a process where a periodic notification is made in an M2M system according to one embodiment of the present disclosure.

FIG. 7 is a view showing a process of making a periodic notification in an M2M system according to one embodiment of the present disclosure.

In one embodiment, an M2M system may include an M2M entity 1 701 and an M2M entity 2 702, and the entities may be numbered randomly.

First, the M2M entity 1 701 may transmit (S710) a message requesting a periodic notification. The message requesting the periodic notification may be transmitted to the M2M entity 2 702 and be included in a subscription request message for a specific resource. When a subscription request message requests a periodic notification, the subscription request message may include a start time (e.g., 9 AM), an end time (e.g., 3 PM) and a notification interval (e.g., 1 hour).

When receiving a message, the M2M entity 2 702 may perform local processing (711). In one embodiment, when receiving a subscription request message requesting a periodic notification for a specific resource, the entity 2 702 may create a subscription resource (e.g., <subscription>) as a child resource (or sub-resource) of the specific resource in a local processing step. The created subscription resource may include an attribute indicating a notification policy. For example, the attribute may be an <eventNotificationCriteria> attribute. In one embodiment, the attribute indicating the notification policy may express information on a periodic notification and a period for making the periodic notification (e.g., a start time, an end time, and a notification interval) as a condition tag. The generated subscription resource may include an exact extent of information on a notified target (notification target) and a subscribed target.

The entity 2 702 performing the local processing may periodically transmit a notification (notification message) 712, 714, 715 and 716 to the entity 1 701. For example, notification messages 712, 714, 715 and 716 may be transmitted based on a start time, an end time and a notification interval of the above-described periodic notification, and the notification interval 713 may remain the same between each notification message 712, 714, 715 and 716.

Meanwhile, a method and apparatus for receiving and transmitting a periodic notification in each subject will be described in further detail below with reference to FIGS. 8 to 10.

Figure 8:
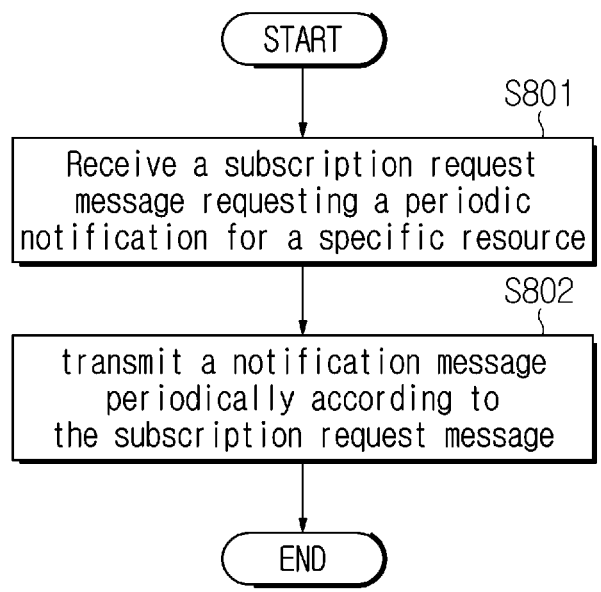
FIG. 8 is a view showing a flowchart of transmitting a periodic notification in an M2M system according to one embodiment of the present disclosure.

FIG. 8 is a view showing a method of performing (transmitting) a periodic notification in an M2M system according to one embodiment of the present disclosure. In one embodiment, the method may be implemented between M2M entities.

In one embodiment, a subscription request message requesting a periodic notification for a specific resource may be received (S801). As mentioned above, a subscription request message for a specific resource may include a message requesting a periodic notification. In addition, when requesting a periodic notification, a subscription request message may include a start time (e.g., 9 AM), an end time (e.g., 3 PM) and a notification interval (e.g., every hour) of the periodic notification.

When the subscription request message is received before a notification message is periodically transmitted, a subscription resource (e.g., <subscription>) may be created as a sub-resource of the specific resource. The subscription resource may include information on the M2M entity and information on subscription scope. This may be expressed by a condition tag of an attribute (e.g., <eventNotificationCriteria>) of a created subscription resource (e.g., <subscription>). Further details thereof will be described with reference to FIG. 9 below.

In one embodiment, a notification message may be transmitted (S802) periodically according to the subscription request message. A periodic notification message may include information on a subscribed-to resource and be transmitted even when no change occurs to the subscribed-to resource. In addition, as mentioned above, the notification message may be transmitted based on the start time, the end time, and the time interval. The periodic notification (notification message) may be indicated as an attribute of the subscription resource, which may be <eventNotificationCriteria>, for example. The periodic notification is indicated by a condition tag of the attribute. The condition tag may include <notificationEventType>. Further details thereof will be described with reference to FIG. 9 below.

Meanwhile, the above-mentioned names of attribute, resource or condition tag are merely one embodiment and thus are not limited thereto.

Figure 9:
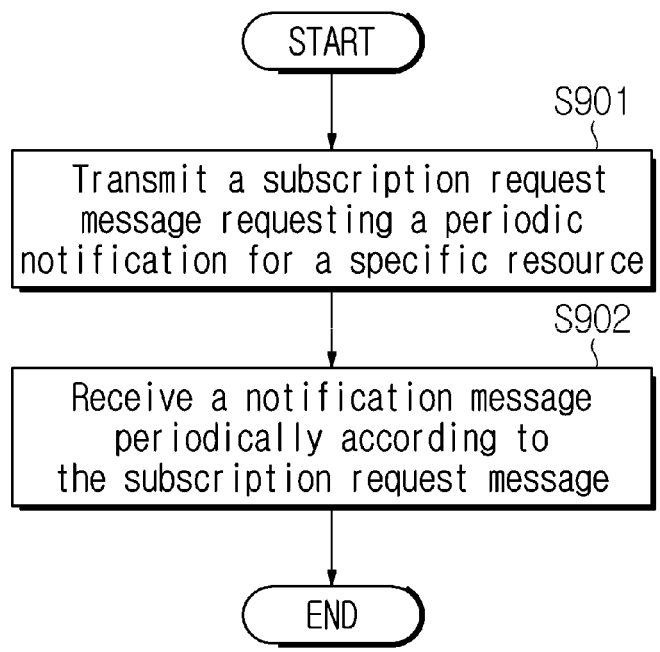
FIG. 9 is a view showing a flowchart of receiving a periodic notification in an M2M system according to one embodiment of the present disclosure.

FIG. 9 is a view showing a method of receiving a periodic notification in an M2M system according to one embodiment of the present disclosure. In one embodiment, the method may be implemented between M2M entities.

In one embodiment, a subscription request message requesting a periodic notification for a specific resource may be transmitted (S901). The subscription request message may be the same as mentioned above, include a periodic notification request message, and create a subscription resource (e.g., <subscription>) as a sub-resource of the specific resource. In addition, the subscription resource may include information on the M2M entity and information on a subscription scope. A condition tag (e.g., <notificationEventType> of an attribute (e.g., <eventNotificationCriteria>) of a created subscription resource (e.g., <subscription>) may express that a periodic notification has been requested by the subscription request message. In addition, a start time (e.g., 9 AM), an end time (e.g., 3 PM) and a notification interval (e.g., every hour) of a periodic notification, which is capable of being included in a subscription request message, may be expressed as a condition tag (e.g., PeriodNoti) of an attribute (e.g., <eventNotificationCriteria>) of a created subscription resource (e.g., <subscription>). In one embodiment, a condition tag may be as shown in Table 11 below.

TABLE 11

| Condition tag | Matching condition |
| --- | --- |
| notification EventType | The type of event that shall trigger a notification. If multiple notificationEventType tags are present, a notification shall be triggered if any of the configured events occur. Note that not all permutations of event type are meaningful. Possible notification event type values are:<br>A. Update to attributes of the subscribed-to resource<br>B. Deletion of the subscribed-to resource,<br>C. Creation of a direct child of the subscribed-to resource,<br>D. Deletion of a direct child of the subscribed-to resource<br>E. An attempt to retrieve a <contentInstance> direct-child-resource of a subscribed-to <container> resource is performed while this <contentInstance> child resource is an obsolete resource or the reference used for retrieving this resource is not assigned. This retrieval is performed by a RETRIEVE request targeting the subscribed-to resource with the Result Content parameter set to either "child-resources" or "attributes + child-resources". This value for the eventNotificationType tag implies that the subscribed-to resource shall be an <container> resource. Otherwise this setting is not valid. |

TABLE 11-continued

| Condition tag | Matching condition |
|---|---|
| | F. Trigger Received targeting the MN/ASN-AE associated with the <AE> parent resource. This implies that the subscribed-to resource shall be an <AE> resource instance. Otherwise this setting is not valid.<br>G. Update to attributes of the subscribed-to resource with blocking of the triggering UPDATE operation. For this eventNotificationType value setting, only one single Notification Target shall be present in the notificationURI attribute - see notificationURI attribute definition. This value for the eventNotificationType tag shall not be combined with any other eventNotificationType tag value. This value for notificationEventType establishes a subscription that is triggered for the same events as for the value "Update to attributes of the subscribed-to resource". However, upon occurrence of a triggering UPDATE operation that has been validated and results in an authorized UPDATE operation, the triggering UPDATE operation shall be blocked by the Hosting CSE until a notification request was sent out and a corresponding response message was received or a timeout happens. When the response status code of the notification response message indicates a successful notification reception in combination with a successful notification action taken by the Notification Target entity, the triggering UPDATE operation shall be completed with a successful update of the targeted attribute(s). If the notification response message indicates an unsuccessful notification reception or a successful notification reception with unsuccessful notification action by the targeted entity or times out, the blocked UPDATE operation shall be completed with no success and no change of the targeted attribute(s). For any subscribed-to resource there shall exist a maximum of one subscription with this setting of notificationEventType. All other notification policies shall not be allowed when this setting of notificationEventType is used. The notificationContentType shall be "modified attributes". When an UPDATE operation has been blocked due to triggering this type of notification, any other occurring UPDATE or DELETE requests to the same resource shall be handled only after the blocked UPDATE operation has been completed.<br>H. periodic reporting |
| periodNoti | The periodNoti includes three values: start time, end time and interval of periodic reporting. This condition tag is only applicable when notificationEventtype has a value of periodic reporting. |

In one embodiment, requesting a periodic notification by a subscription request message may be expressed by the condition tag <notificationEventType> of Table 11 above, and the start time, end time and notification interval of a periodic notification may be expressed by the condition tag <periodNoti> of Table 11 above. In this case, <periodNoti> may be valid only when <notificationEventType> indicates a periodic notification.

In one embodiment, it is possible to periodically receive (S902) a notification message according to the subscription request message. The notification message may be transmitted based on a subscription resource created as a sub-resource of the specific resource by the subscription request message. In addition, as mentioned in FIG. 7 and FIG. 8, an M2M entity receiving a subscription request message, which includes a periodic notification request, may create a subscription resource. The subscription resource may include information on the M2M entity and information on a subscription scope. As mentioned above, the notification message may be transmitted based on the start time, the end time, and the time interval. The periodic notification may be indicated by a condition tag of the attribute.

Meanwhile, the above-mentioned names of attribute, resource or condition tag are merely one embodiment and thus are not limited thereto.

Figure 10:
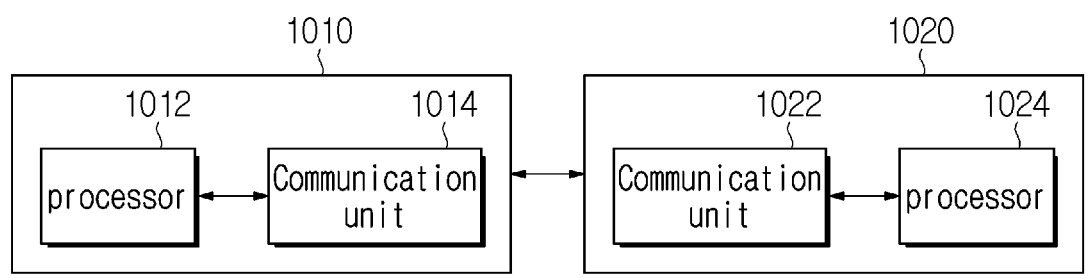
FIG. 10 is a view showing an M2M apparatus for transmitting and receiving a periodic notification in an M2M system according to one embodiment of the present disclosure.

FIG. 10 is a view showing an M2M apparatus in an M2M system according to one embodiment of the present disclosure. More particularly, FIG. 10 illustrates an M2M apparatus capable of implementing the above-mentioned method of transmitting and receiving a periodic notification message according to one embodiment of the present disclosure, that is, a computing system capable of implementing the method and apparatus for transmitting and receiving a periodic notification message.

Referring to FIG. 10, an M2M apparatus 1010 may include a processor 1012 controlling the apparatus and a communication unit 1014 transmitting and receiving a signal. Here, the processor 1012 may control the communication unit 1014. In addition, the M2M apparatus 1010 may perform communication with another M2M apparatus 1020. The another M2M device 1020 may also include a processor 1024 and a communication unit 1022, and the processor 1024 and the communication unit 1022 may perform the same functions as the processor 1012 and the communication unit 1014.

In one embodiment, the communication units 1014 and 1022 may be communication modules or communicators and exchange signals with a third-party entity, that is, an M2M entity. Herein, the communication units 1014 and 1022 may only receive a signal or only transmit a signal or receive and transmit a signal. When the communication units are realized to perform both functions of transmitting and receiving a signal, a communication unit may be realized either by being divided into a transmitter and a receiver or through a single transceiver.

In addition, the processors 1012 and 1024, which control a communication unit, may create a request message to be transmitted to another M2M apparatus, transmit the created request message to the another M2M apparatus, and receive a response message from for the request message from the another M2M apparatus. The request message may request a periodic notification and the response message may be the periodic notification message. When the request message requests a periodic notification, the scheduling resource may be a child resource of a subscription resource. This may be the same as mentioned above.

In addition, the apparatuses 1010 and 1020 of FIG. 10 may be different M2M apparatuses. For example, the apparatuses 1010 and 1020 of FIG. 10 may be terminals, devices, apparatuses, vehicles or base stations performing communication, or other apparatuses located in an M2M platform. In other words, the apparatuses 1010 and 1020 of FIG. 10 refer to apparatuses capable of performing communication and are not limited to the above-described embodiment.

Also, in one embodiment, although not illustrated in FIG. 10, if described in further detail, each M2M apparatus of FIG. 10 may include a memory including random access memory (RAM) and read only memory (ROM), a processor, a user interface input device, a user interface output device, a storage, a network interface, and a bus.

According to a method, an apparatus and a computing system for transmitting and receiving a periodic notification in an M2M system according to the present disclosure, a resource, an attribute and a condition tag may be maximally utilized for notification when a single event occurs. More particularly, it is possible to minimize the change of various specifications, data and a procedure used in a current M2M communication.

Accordingly, even when a periodic notification is transmitted and received, the same notification criteria as when a single event occurs are capable of being applied and thus the method, the apparatus and the computing system may be economical and efficient.

In addition, a problem may be prevented which is likely to occur when defining a new separate resource for a periodic notification. For example, when the new separate resource is defined, a procedure for creating and using the resource, the resource updating procedure, and the resource retrieval and deletion procedure may have to be newly established. This may be inefficient since many specifications need to be changed. However, the present disclosure uses a predefined resource without defining a new resource, which is more efficient. In addition, since it is not necessary to define a new attribute for a new resource and/or common attribute, no additional burden occurs.

Effects obtained in the present disclosure are not limited to the above-mentioned effect, and other effects not mentioned above may be clearly understood by those skilled in the art from the following description.

In the exemplary system described above, processes are described as a series of steps or blocks based on a flowchart, aspects of the present disclosure are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present disclosure.

The above description is to explain the technical aspects of exemplary embodiments of the present disclosure, and it will be apparent to those skills in the art that modifications and variations can be made without departing from the spirit and scope of the present disclosure. Thus, it is intended that the present disclosure cover the modifications and variations of this disclosure provided they come within the scope of the appended claims and their equivalents.

The above-described exemplary embodiments of the present disclosure may be implemented by various means. For example, the exemplary embodiments of the present disclosure may be implemented by hardware, firmware, software, non-transitory computer-readable medium on which a software or command is stored and executable on a device or a computer, or a combination thereof.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an exemplary embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present disclosure are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present disclosure.

What is claimed is:

1. A method of transmitting a periodic notification in a machine-to-machine (M2M) system, the method comprising:
   receiving a subscription request message requesting a periodic notification for a specific resource from an M2M entity, wherein the subscription request message includes a start time, an end time and a notification interval for a periodic notification;
   generating a subscription resource defining that the periodic notification is requested for the specific resource; and
   transmitting a notification message to the M2M entity based on the periodic notification according to the subscription request message,
   wherein the notification message is periodically transmitted irrespective of whether the specific resource changes, and
   wherein the notification message is transmitted periodically at a time interval indicated by the notification interval, during a period between the start time and the end time without any event related the specific resource.

2. The method of claim 1,
   wherein the subscription resource is created as a sub-resource of the specific resource when the subscription request message is received, and
   wherein the subscription resource includes information on the M2M entity and information on a subscription scope.

3. The method of claim 1,
   wherein the subscription resource includes a first attribute indicating that a type of requested notification is the periodic notification, and a second attribute including the start time, the end time and the notification interval,
   wherein the second attribute is applicable in case that the type of requested notification is the periodic notification.

4. The method of claim 1, wherein the periodic notification is indicated as an attribute of the subscription resource.

5. The method of claim 4,
   wherein the attribute is <eventNotificationCriteria>.

6. The method of claim 5,
   wherein the periodic notification is indicated as a condition tag of the attribute, and
   wherein the condition tag comprises <notificationEventType>.

7. The method of claim 1, wherein the start time, the end time and the notification interval are expressed through an attribute of the subscription resource.

8. The method of claim 7, wherein the attribute is <eventNotificationCriteria>.

9. The method of claim 8, wherein the start time, the end time and the notification interval are expressed as a condition tag of the attribute.

10. A method of receiving a periodic notification in a machine-to-machine (M2M) system, the method comprising:
    transmitting, to an M2M entity, a subscription request message requesting a periodic notification for a specific resource, wherein the subscription request message includes a start time, an end time and a notification interval for a periodic notification; and receiving, from the M2M entity, a notification message based on the periodic notification, wherein the notification message is periodically received irrespective of whether the specific resource changes, and wherein the notification message is received periodically at a time interval indicated by the notification interval, during a period between the start time and the end time, without any event related the specific resource.

11. The method of claim 10, wherein the notification message is transmitted based on a subscription resource that is created as a sub-resource of the specific resource by the subscription request message.

12. The method of claim 11, wherein the subscription resource includes information on the M2M entity and information on a subscription scope.

13. The method of claim 10, wherein the periodic notification is indicated as a condition tag of an attribute of the subscription resource.

14. The method of claim 13, wherein the attribute is <eventNotificationCriteria>.

15. The method of claim 14, wherein the start time, the end time and the notification interval are expressed through an attribute of the subscription resource.

16. The method of claim 15, wherein the attribute of the subscription resource is <eventNotificationCriteria>.

17. A machine-to-machine (M2M) apparatus in an M2M system, the M2M apparatus comprising:

a communication unit for transmitting and receiving a signal; and a processor for controlling the communication unit and configured to:

receive a subscription request message requesting a periodic notification for a specific resource from an M2M entity, wherein the subscription request message includes a start time, an end time and a notification interval for a periodic notification;

generate a subscription resource defining that the periodic notification is requested for the specific resource; and transmit a notification message to the M2M entity based on the periodic notification, and wherein the notification message is periodically transmitted irrespective of whether the specific resource changes, and wherein the notification message is transmitted periodically at a time interval indicated by the notification interval, during a period between the start time and the end time without any event related the specific resource.

* * * * *